United States Patent
Quach et al.

(10) Patent No.: US 8,763,678 B2
(45) Date of Patent: Jul. 1, 2014

(54) MOLD FOR PRODUCING PARTS BY WAX INJECTION

(75) Inventors: Daniel Quach, Fontenay Sous Bois (FR); Yvon Marie-Joseph Louesdon, Taverny (FR); Patrick Pourfilet, Asnieres Sur Seine (FR); Jean-Louis Martial Verger, Bondy (FR); Patrick Wehrer, Maisons Laffitte (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 13/823,829

(22) PCT Filed: Oct. 5, 2011

(86) PCT No.: PCT/FR2011/052326
§ 371 (c)(1),
(2), (4) Date: Mar. 15, 2013

(87) PCT Pub. No.: WO2012/045982
PCT Pub. Date: Apr. 12, 2012

(65) Prior Publication Data
US 2013/0174997 A1 Jul. 11, 2013

(30) Foreign Application Priority Data
Oct. 6, 2010 (FR) ..................................... 10 58098

(51) Int. Cl.
*B22C 9/06* (2006.01)
*B22C 7/02* (2006.01)
*B22D 17/22* (2006.01)
*B22D 17/26* (2006.01)

(52) U.S. Cl.
USPC ............ 164/159; 164/235; 164/342; 164/344

(58) Field of Classification Search
USPC .......... 164/159, 228, 235, 339, 342, 344, 412
See application file for complete search history.

(56) References Cited

U.S. PATENT DOCUMENTS

| | | | | |
|---|---|---|---|---|
| 4,078,598 | A * | 3/1978 | Kelso et al. ..................... | 164/30 |
| 5,124,105 | A * | 6/1992 | Broughton et al. ........... | 264/219 |
| 5,296,308 | A * | 3/1994 | Caccavale et al. ............ | 428/586 |
| 7,275,585 | B1 * | 10/2007 | Guerche et al. ................ | 164/516 |
| 7,569,172 | B2 * | 8/2009 | Pietraszkiewicz et al. | 264/328.2 |
| 7,862,325 | B2 * | 1/2011 | Pietraszkiewicz et al. ... | 425/443 |
| 7,871,245 | B2 * | 1/2011 | Pietraszkiewicz et al. . | 416/96 R |
| 7,931,459 | B2 * | 4/2011 | Louesdon et al. ............ | 425/175 |
| 2002/0088600 | A1 | 7/2002 | Beeck et al. | |

FOREIGN PATENT DOCUMENTS

EP   1 216 770   6/2002

OTHER PUBLICATIONS

International Search Report Issued Feb. 24, 2012 in PCT/FR11/52326 Filed Oct. 5, 2011.

* cited by examiner

*Primary Examiner* — Kevin P Kerns
(74) *Attorney, Agent, or Firm* — Oblon, Spivak, McClelland, Maier & Neustadt, L.L.P.

(57) ABSTRACT

A mold for producing a part, such as a turbomachine blade model, by injecting wax into a cavity, the cavity including at least two cavity elements, each of which is supported in a cavity block. The two cavity blocks are mobile relative to one another between a closed position for injecting the wax and an open position for removing the part following the injection of the wax. The two cavity blocks are mobile in a horizontal plane.

8 Claims, 6 Drawing Sheets

MOLD FOR PRODUCING PARTS BY WAX INJECTION

FIELD OF THE INVENTION

The present invention relates to a mold for producing parts by injecting wax into a cavity. It relates more particularly to the production of models for turbomachine blades intended to be utilized in turn for the production of blades by the lost wax casting technique.

BACKGROUND OF THE INVENTION

Within the context of the production of blades according to the lost wax casting technique, a model is produced in wax—this being the designation used for all material suitable for this purpose—around which a shell mold is produced in a refractory material. Once the shell mold has hardened, the model is removed by causing the wax to melt. A cavity then exists inside the shell mold, into which the metal will be poured. The part reproducing the form of the model is extracted by shaking out the shell mold.

The model itself is produced in an appropriate mold, the cavity of which defines its form. The wax is injected into the cavity of the mold by means of an injection press. The press permits the injection of wax into the injection channel of the mold via an injection nozzle.

The cavity of the part is formed by at least two cavity elements, which are held firmly together one against the other at the moment of injection of the wax under pressure. For this purpose, the cavity elements are supported individually in cavity blocks that are capable of displacement in relation to one another. It should be noted that the cavity can be formed by more than two elements, although generally these other elements merely perform a complementary role.

According to the prior art cited by the applicant for the production of a blade model of which the general form is elongated in a defined direction between the foot and the head of the blade with an intrados face and an extrados face, the mold is arranged in a horizontal plane, and the cavity in the mold is oriented horizontally. The model is thus injected in a horizontal direction, the intrados face and the extrados face also being oriented horizontally. The handling operations are all manual. The operator opens the mold by manually lifting the upper section of the mold upwards. He then removes the model from the cavity, also manually.

This type of mold exhibits a number of disadvantages.

As a result of its horizontal orientation, the cavity may receive unintentional blows by tools on the part of the operator (screwdrivers, knives, compressed air nozzles) or marks left by equipment which damage it. These marks may then be the subject of costly repairs, which require the tooling to be taken out of service and the production of the parts to be suspended as a result.

The document EP 1216770 proposes a different configuration of the mold for producing a turbine blade in which the cavities mobile in translation are put together horizontally. Their handling, especially for separating then, needs to let them slide on an horizontal support means.

Manual opening because of the weight of the elements may be experienced by the operator as burdensome. In addition, the opening procedure involves numerous operations which, although simple, nevertheless take a lot of time and may adversely affect the quality of the model.

The manual removal of the wax model may give rise to deformation of the latter or may even cause it to break.

The mold contains numerous elements and subcomponents, and a lot of time is required for their design and realization.

The object of the invention is accordingly a mold which overcomes these disadvantages.

SUMMARY OF THE INVENTION

Thus, in accordance with the invention, the mold for producing a turbomachine blade model by injecting wax into a cavity, the cavity including at least two cavity elements forming respectively at least the intrados face and the extrados face of a blade of a turbomachine and each supported in a cavity block, the two cavity blocks being mobile relative to one another in a horizontal movement plane between a closed position for injecting the wax and an open position for removing the part following the injection of the wax, by being driven by a means for setting into motion, or a manual means or a motor, said means for setting into motion comprises a fixed plate forming a base for the cavity blocks, a plate that is mobile in translation relative to the base plate, through a transmission means to said mobile plate of the efforts made by said manual means or motor, and a mechanism by which the relative displacement between the mobile plate and the fixed plate drives that of the blocks.

The simple fact of orienting the two cavity blocks thus permits the problems of the prior art to be solved.

Advantageously, the two cavity blocks are mobile in a circular arc making it possible to follow the cylindrical profile of the platform and of the root, as the case may be.

The mold is not limited to two elements it is capable of containing at least a third cavity element supported by a cavity block that is mobile in relation to said two cavity elements between a closed position for injecting the wax and an open position for removing the part following the injection of the wax. In particular, the third element, in the case of a blade for a turbomachine, forms the root of said blade. It is preferably mobile in translation together with its cavity support.

According to another characterizing feature, the mold contains a part ejector for removing the part from the cavity on opening the cavity elements. The arrangement of the cavities according to the invention permits the provision of an ejector which intervenes without handling of the part by the operator.

According to another characterizing feature, the cavity blocks are caused to move by a means for setting into motion, such as a manual means or a motor means. In the case of a motor means, automation provides the operator with a degree of operating convenience that is beneficial for the quality of the part. The risks of deterioration resulting from a handling incident are significantly reduced.

According to a preferred embodiment, the mold comprises a mechanism with lugs, each being integral with a cavity block and being guided in slots arranged in the plate that is mobile in translation and in the base plate, the displacement of the mobile plate driving that of the blocks by means of the lugs. In particular, the mechanism comprises a means for driving the part ejector.

According to another characterizing feature, the mold contains a means for disassociating the cavity blocks from the mobile plate in such a way as to make the displacement of the blocks independent from that of the mobile plate.

BRIEF DESCRIPTION OF THE DRAWINGS

The invention will be more readily understood, and its other aims, details, characterizing features and advantages will be more clearly appreciated from the following detailed explanatory description of an embodiment of the invention given by way of a purely illustrative example and without limitation, with reference to the accompanying schematic drawings.

DETAILED DESCRIPTION OF THE PREFERRED EMBODIMENTS

Figure 1:
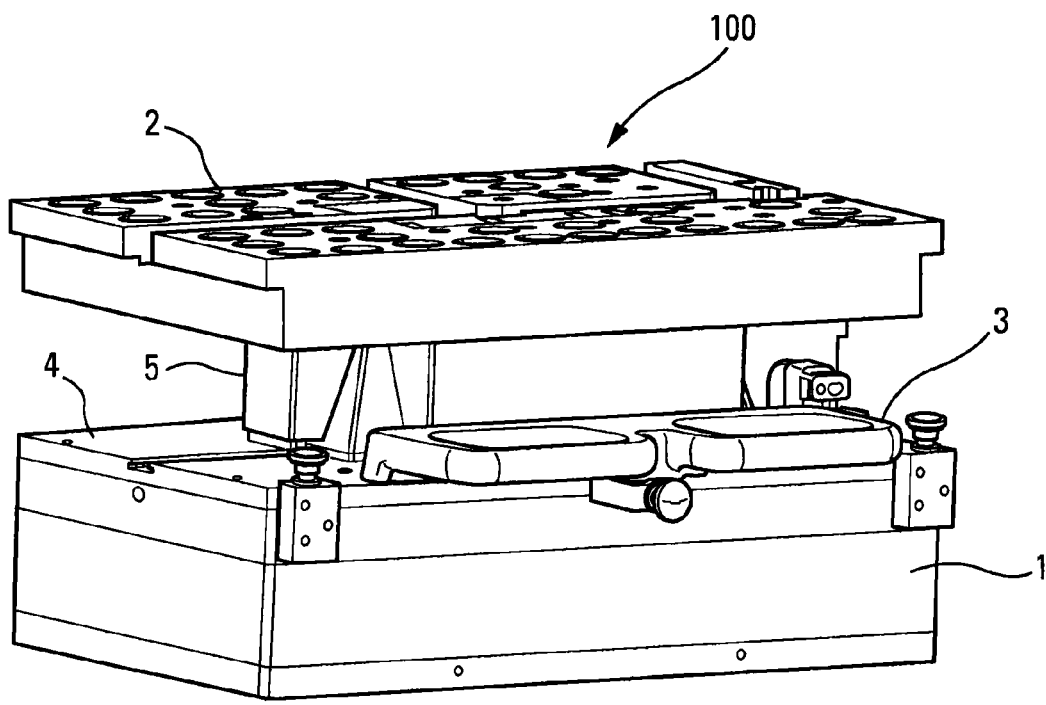
FIG. 1 is an overall perspective view of the tooling and its cover.

FIG. 1 depicts the tooling 100 in the closed position. It comprises a lower plate 1, which, at the time of injection of the wax, rests on the lower plate of the wax injection press. The press is not illustrated in FIG. 1. The tooling also comprises an upper plate 2, which, when in the wax injection position, is present beneath the upper plate of the wax injection press. The assembly as a whole may be displaced by means of two handles 3, before and after injection. It is possible to distinguish a plate 4 forming a base for the cavity blocks 6, 7 and 11, these being visible together in FIG. 3, which are retained by the closing corners of a cover 5. The corners forming the cover 5 are integral with the upper plate 2.

Figure 2:
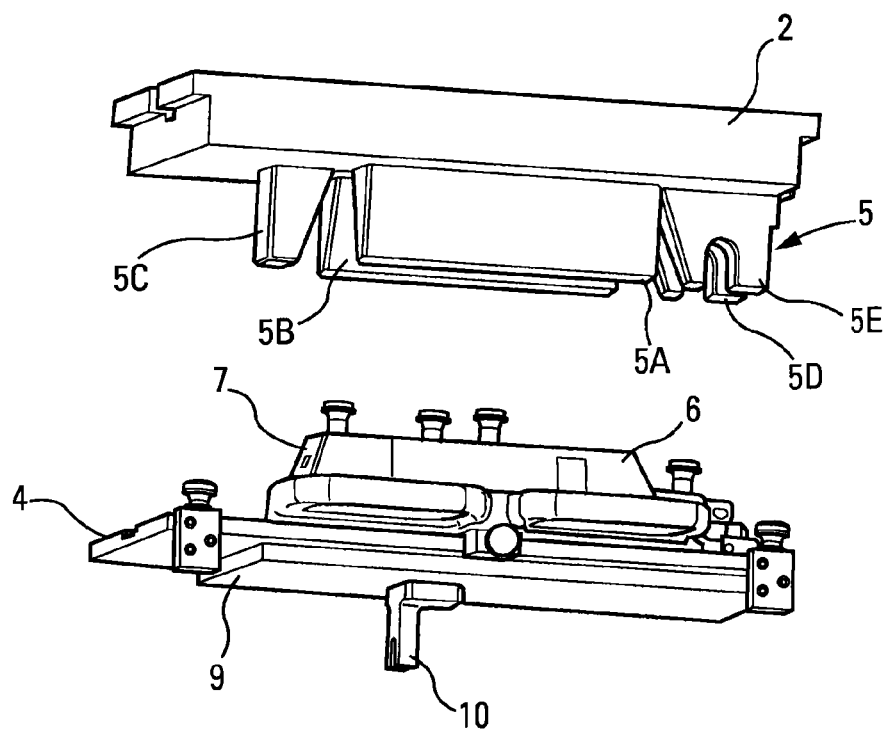
FIG. 2 is a perspective view of the tooling without the lower plate, revealing the mobile plate, and with the cover raised.

FIG. 2 depicts the tooling without the lower plate 1 and with the cover 5 raised. It is possible to distinguish the cavity blocks 6, 7 on the base plate 4 as well as a mobile plate 9 that is a driving plate beneath the base 4 and capable of displacement parallel to the latter; a tool post 10 is integral with the mobile plate 9. This is intended to be driven horizontally by means of a motor means (not illustrated). This means is mounted, for example, in the lower plate 1.

The corners 5A, 5B, 5C, 5D, 5E exhibit inclined planes interacting with the external surfaces of the cavity blocks 6, 7, 11. In the position depicted in FIG. 1, the corners retain the cavity blocks in the assembled position.

Figure 3:
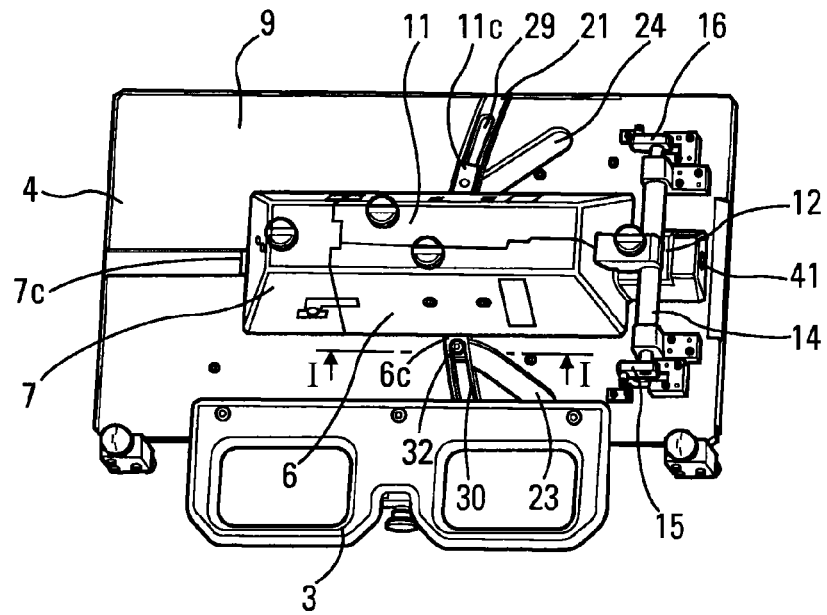
FIG. 3 is a top view of the tooling showing the cavity blocks in the closed position.

FIG. 3 illustrates, in a perspective view, the top of the tooling when the upper plate 2 has been removed. The base 4 supports three cavity blocks 6, 7 and 11, in this case in the assembled position. The three cavity blocks each support a section of the cavity for the part to be molded, forming a cavity element. The cavity blocks 6 and 11, for example, support the cavity elements for reproducing, on the one hand, the extrados face and, on the other hand, the intrados face of a turbomachine blade. The third cavity block 7 supports the cavity element for reproducing the root of the blade.

Figure 4:
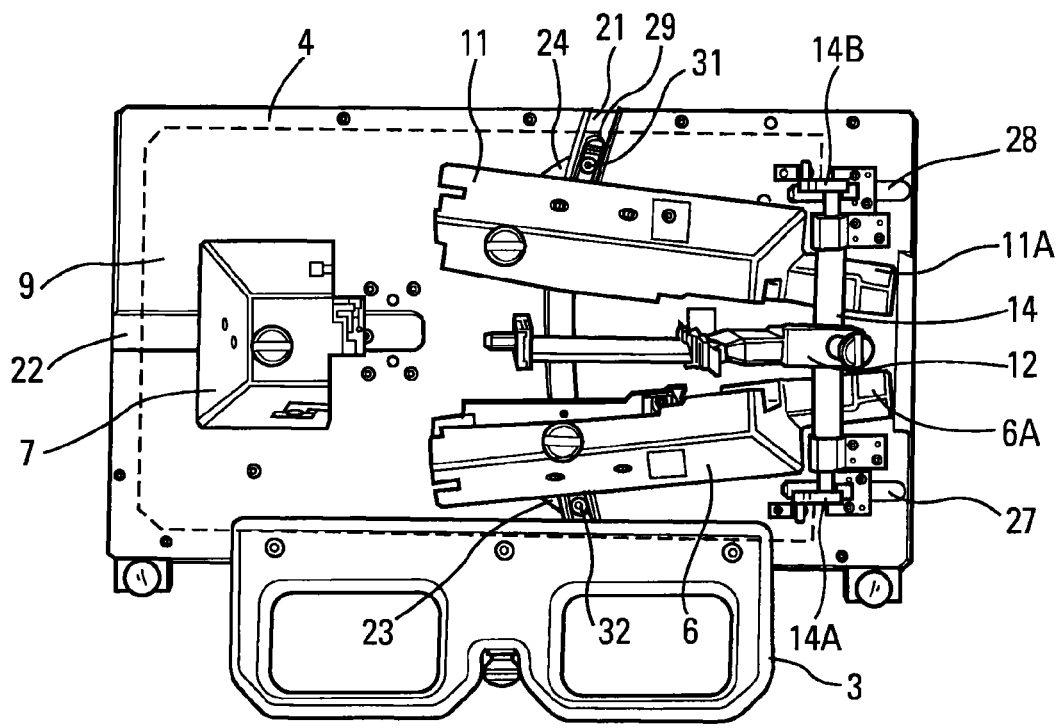
FIG. 4 is a top view of the tooling showing the cavity blocks in the open position.

FIG. 4 depicts the top of the tooling, as in FIG. 3, although the cavity blocks are in the open position. The blocks 6 and 11 have pivoted about a center of rotation corresponding to the center of the circle formed by a rail 21 in a circular arc. This rail, which is oriented transversally in relation to the plane of contact of the cavity elements, guides the blocks 6 and 11 in the course of their displacement between the closed position in FIG. 3 and the open position in FIG. 4. It should be noted that, in the case of the part being a model of a blade having a platform arranged at the foot of the blade and a root at the head of the blade of cylindrical form, the movement in a circular arc makes it possible to follow their respective profile. The blocks are each integral with a slider 6C, 11C that is capable of displacement along the rail 21. The cavity block 7 is integral with a slider 7C that is capable of displacement and is guided in translation between the closed position and the open position along a rail 22. The sliders are visible in FIG. 3.

The open position depicted in FIG. 4 allows the ejector 12 to be seen, present in the prolongation of which is a part 20 following the injection of the wax. It can be appreciated that the part in this case is a model of a turbomachine blade. The ejector 12 comprises a mobile ejector knife rotating about a horizontal shaft 14 perpendicular to the rail 22. The cavity blocks 6 and 11 each comprise a prolongation, 6A and 11A, extending towards the edge of the base 4, which between them accommodate a channel 40 for the injection of wax from an injection nozzle 41, which prolongations are visible in FIG. 6.

Figure 6:
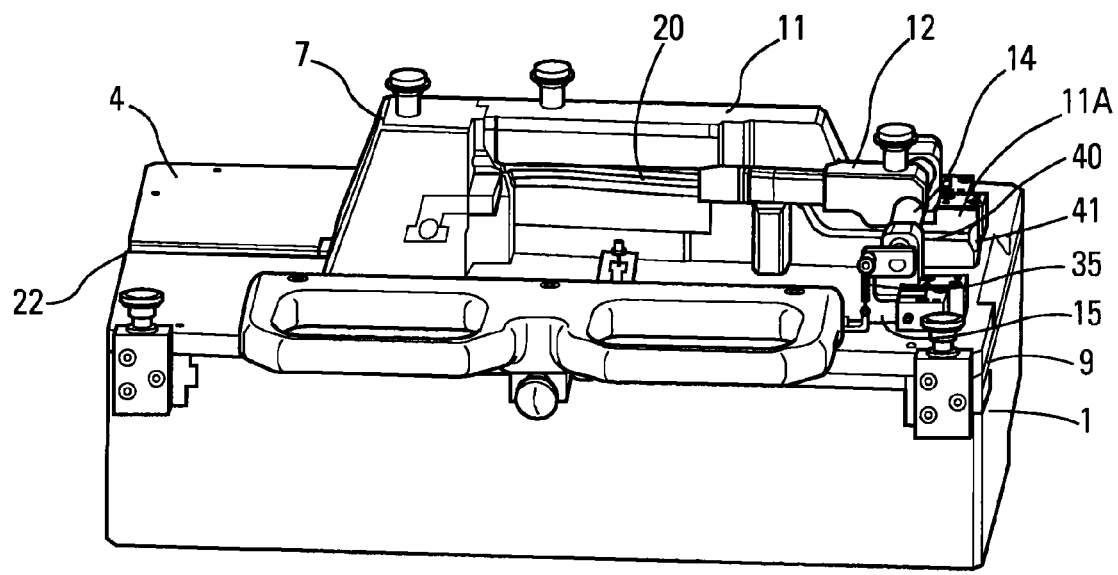
FIG. 6 is a side view of the tooling, the longitudinal cavity block being withdrawn.

FIG. 6 depicts the interior of the mold from which the cavity block 6 has been removed. In the closed mold, the part 20, which in this case is a model of a blade, is oriented horizontally. The following is one possible arrangement of the cavity elements: the cavity elements in their respective block are oriented in such a way that the cavity element supported in the longitudinal cavity block 6, which is absent from FIG. 6, is one of the intrados faces or extrados faces of the blade, and the cavity element of the cavity block 11 opposite the cavity of the block 6 is the other of the intrados faces or extrados faces of the blade. The cavity element supported by the cavity block 7 thus corresponds to the root of the blade. The sections of the cavity elements in proximity to the ejector knife 12 form the foot of the blade together with its platform.

Figure 5:
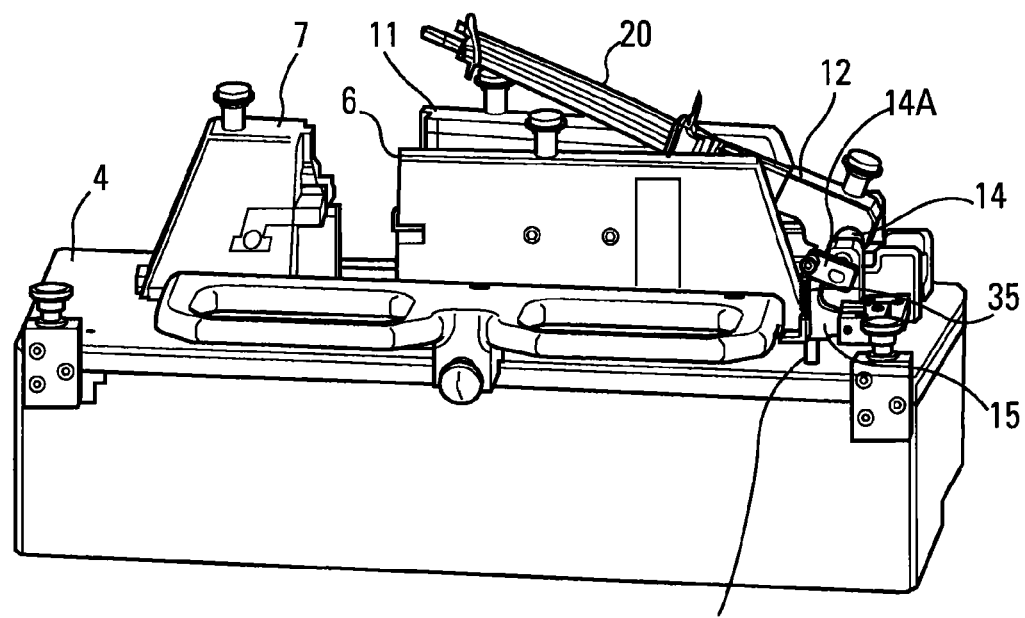
FIG. 5 is a side view of the tooling, the cavity blocks being in the open position and the ejector knife being raised.

The resulting model is also visible in FIG. 5, with the root situated to the side of the free extremity. This is an example without limitation of a cavity, and a person skilled in the art will know how to distribute the different sections of the part between the cavity elements in such a way as to obtain the desired form following the injection of the wax. It should be noted that the cavity elements are mounted in a displaceable manner inside their respective cavity block, and that they are capable of replacement.

In FIG. 6, a portion of the channel 40 for the injection of wax can also be seen on the section 11A of the block 11, discharging into the injection nozzle 41 on one side, and into the volume of the cavity on the other side, although this is not visible in FIG. 6.

Figure 7:
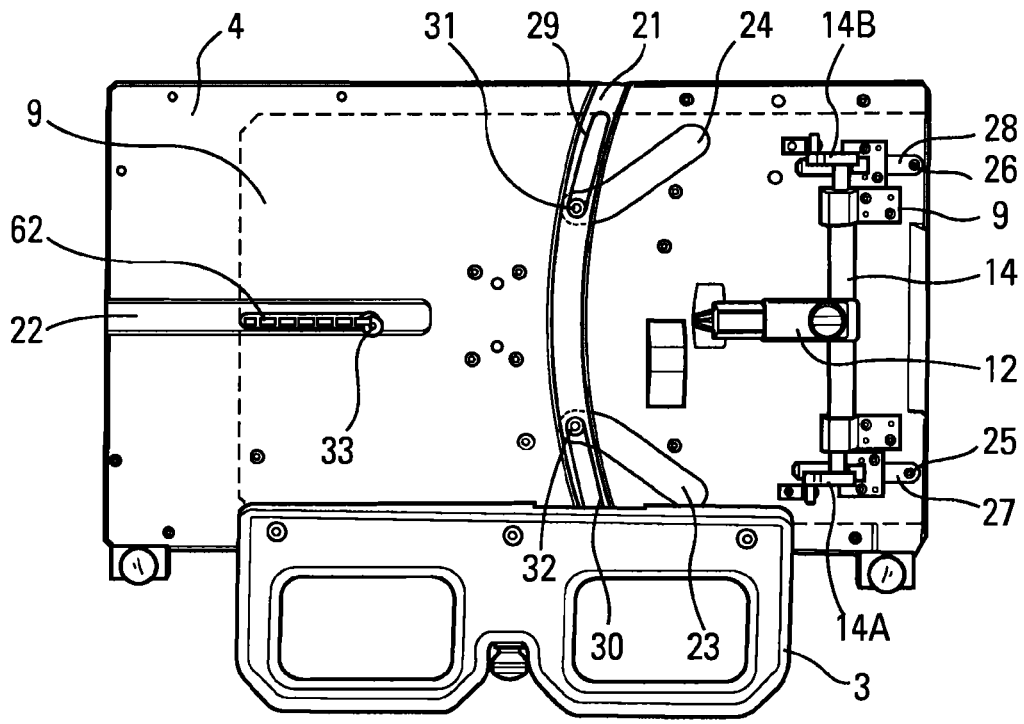
FIG. 7 is a top view of the base plate without the cavity blocks, the subjacent mobile plate being clearly visible in its position on the right.
Figure 8:
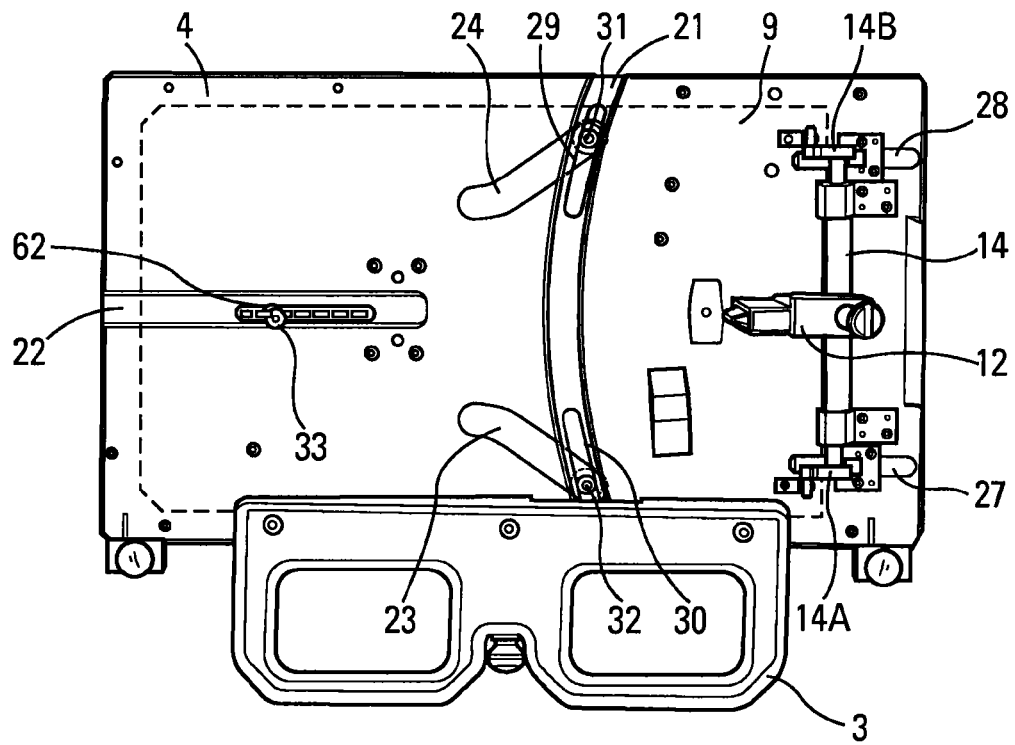
FIG. 8 is a top view corresponding to that in FIG. 7, the mobile plate being in its position on the left.

The opening and closing mechanism is described below. FIGS. 7 and 8 illustrate the tooling without the cavity blocks. The base plate 4 comprises the transversal rail 21 in a circular arc and the longitudinal rail 22. The rail 21 comprises two symmetrical slots 29 and 30, accommodated in which are sliding lugs 31 and 32 respectively. The mobile plate 9, which is clearly visible, is subjacent and comprises two similarly symmetrical slots 23 and 24 forming an angle between them.

The lugs 31 and 32 are guided inside these slots by their lower section. Thus, each of the lugs 31 and 32 comprises an upper section adapted to slide in the slot 29 or 30 of the base plate 4, and a lower section adapted to slide in the slot of the mobile plate 9. In FIG. 7, the mobile plate 9 is situated on the right. The slots 23 and 24 on the one hand and the slots 29 and 30 on the other hand are oriented in respect to one another in such a way that the mobile plate, as it moves towards the left, brings about the sliding of the lugs 31 and 32 in the slots 23 and 24, and in the slots 29 and 30, from the interior towards the exterior, the plate 4 remaining stationary.

A lug 33 is mounted so as to slide in a longitudinal slot 62 of the rail 22; the lug 33 is fixed to the mobile plate 9.

The lugs are connected by respective sliders 6C, 7C and 11C to the three cavity blocks 6, 7, 11. It follows from this that the movement in translation of the mobile plate 9 from right to left, as illustrated in FIGS. 7 and 8, brings about the displacement of the cavity blocks from the closed position, as illustrated in FIG. 3, towards the open position, as illustrated in FIG. 4 or 5. The mobile plate 9 is set into motion by a motor, such as a cylinder, actuated hydraulically, electrically or pneumatically, accommodated advantageously in the interior of the lower plate 1 and acting upon the tool post 10.

Figure 9:
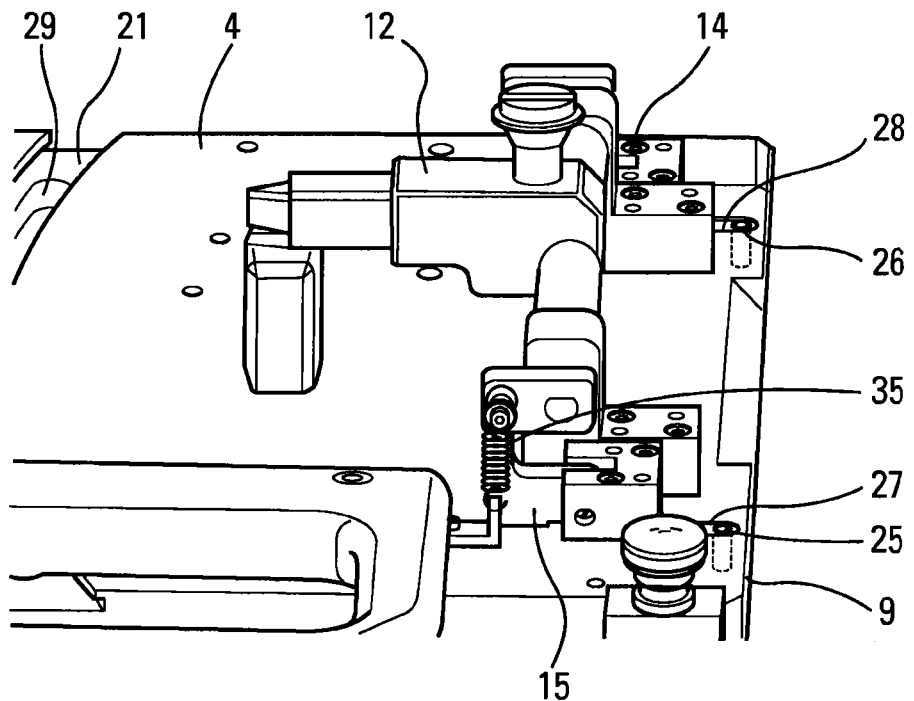
FIG. 9 is a perspective view of the mechanism for actuating the ejector knife, the latter being in its horizontal position.
Figure 10:
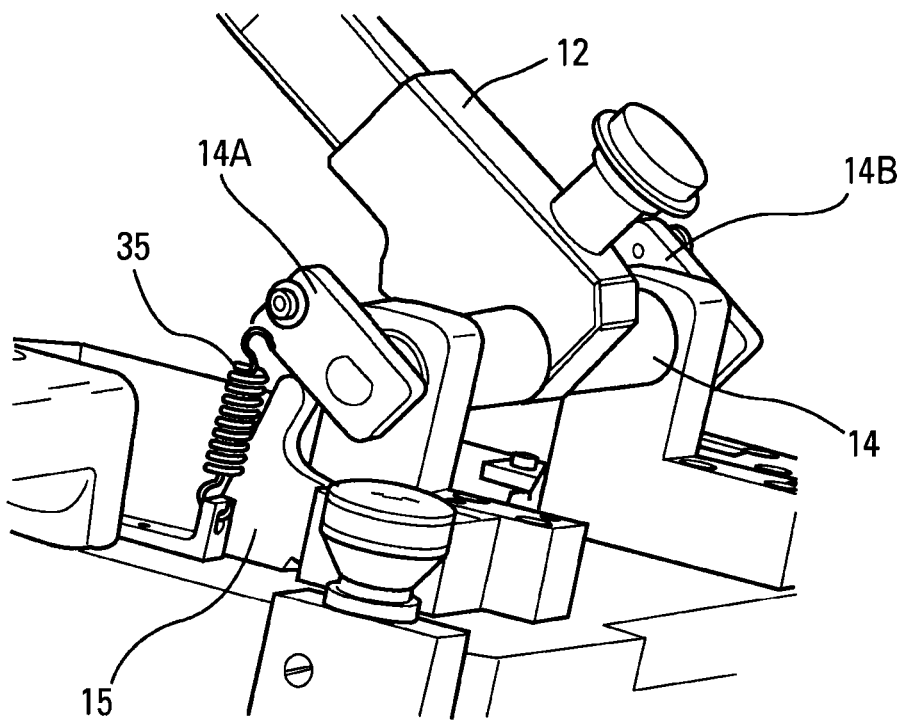
FIG. 10 is a view corresponding to that in FIG. 9, the ejector knife being in its raised position.

The mechanism for driving the ejector 12 is described in relation to FIGS. 9 and 10. The ejector knife 12 is integral with the transversal shaft 14, which is supported by two supports that are integral with the base plate 4. Small vertical plates 14A and 14B are fixed to the extremities of the shaft 14. These rest with their edge on returns in the form of small plates 15 and 16 respectively, pivoting about horizontal shafts that are integral with the stacks supporting the transversal shaft 14.

Slots 27 and 28 are arranged in the base plate 4; the returns 15 and 16 are accommodated in these slots and come to rest upon fingers 25 and 26 that are vertical and integral with the mobile plate 9. A spring 35 keeps the small plates 14A and 14B resting against the returns 15 and 16, and keeps the returns resting against the fingers 25 and 26. The assembly as a whole is arranged in such a way that the ejector knife 12 is in its horizontal position when the driving plate is itself in its position on the right (in relation to FIG. 7, for example); this is the closing position for the elements of the mold. When the plate is displaced towards the left, as illustrated in FIG. 8, the fingers cause the returns, which push the small plates towards the top, to pivot and cause the ejector knife 12 to rotate towards the top.

The function of the tooling is as follows.

FIG. 1 depicts the tooling in the closed position. The wax is injected via a suitable press through the nozzle 41 and the channel 40 into its cavity delimited by the cavity blocks for the intrados face 6, the extrados face 11 and the root 7. FIG. 2 depicts the tooling just before or just after the injection of wax. The upper plate that is integral with the upper plate of the press and the closing corners are in the high position. The handle 3 permits the operator to manipulate and displace the injection tooling on the plane of the press or on other operating planes.

Opening and closing of the tooling are possible by pressing push-buttons, not illustrated here, which in turn activate the motorized cylinder which drives the tool post 10 and displaces the mobile plate 9 in relation to the base plate 4. The wax is injected into the tooling via the injection nozzle 41 and the channel 40. The cavity blocks delimit the cavity into which the wax is injected. The part 20, in this case the model of a blade, is obtained as a result.

The horizontal opening of the tooling is controlled by the operator via push-buttons, not illustrated here, which control the supply to the cylinder and the displacement of the mobile plate 9.

The movement in translation of the mobile plate brings about the displacement of the various lugs 31, 32 and 33 and fingers 25 and 26. The lugs, as they are displaced, drive the cavity blocks 6, 7 and 11, as has already been explained above.

Upon opening, and as the mobile plate 9 is displaced from right to left, the cavity blocks move away from one another parallel to the base 4: the root block 7 by translation along the guide rail 22, and the cavity blocks 6 and 11 by rotation about the center of rotation of the guide rail 21. At the same time, the fingers 25 and 26 press against the returns, which push the small plates and cause the shaft 14 and the ejector knife, of which it is an integral part, to rotate. It is then possible to disengage the wax part, which is present in the prolongation of the ejector knife 12. The extremity of the knife exhibits the form of a blade surrounded by the wax and supports the part 20 during the lifting movement.

For the purpose of closing the mold, it is sufficient to control the displacement of the mobile plate 9 from left to right. The lugs move in the opposite direction, causing the cavity blocks to move towards one another. At the same time, the knife is brought back towards its horizontal position by the spring 35. Once the mold is closed, the wax is injected via the injection nozzle for the production of a new part.

Figure 11:
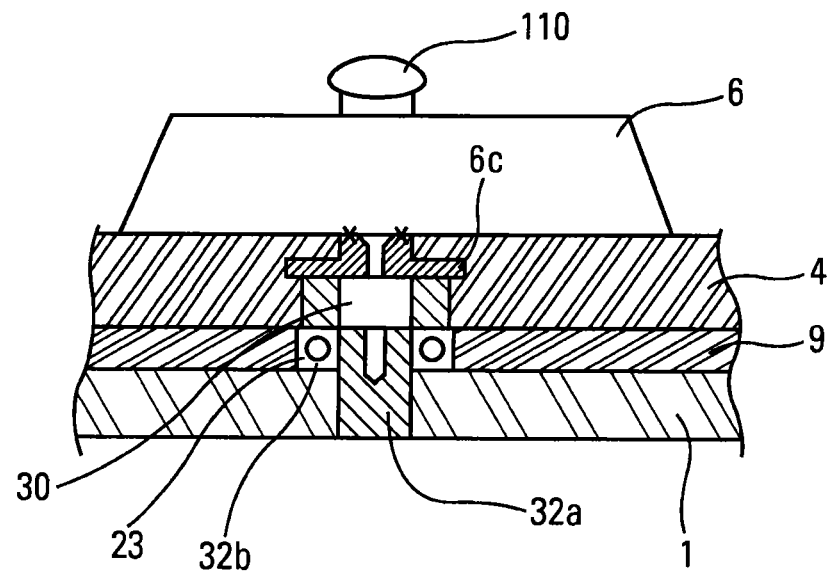
FIGS. 11 and 12 are sectioned views according to the line I-I in FIG. 3, and illustrate a means for providing a detachable connection between the lugs and the cavity blocks.
Figure 12:
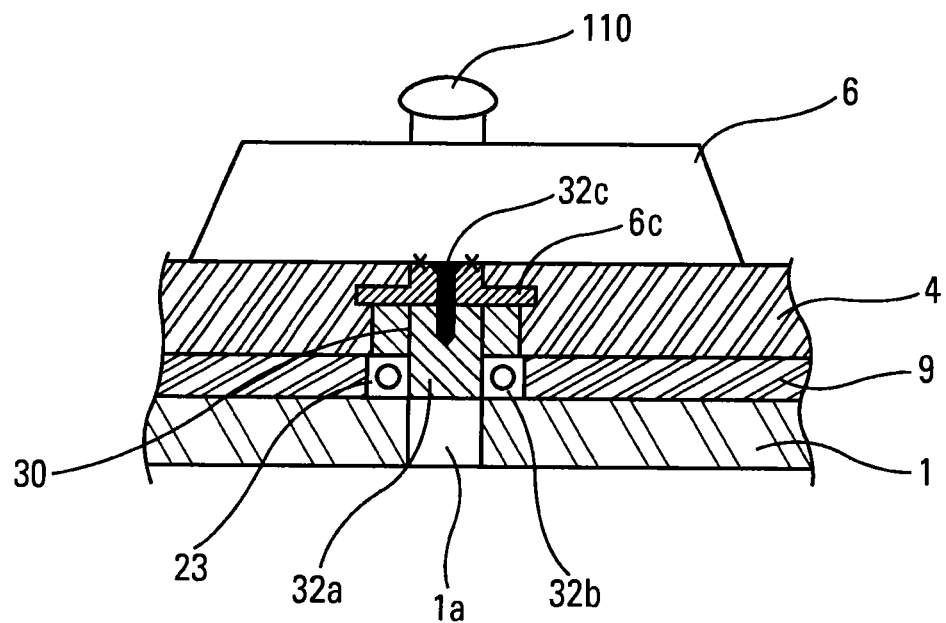

According to one particular embodiment, the driving mechanism may be activated in such a way as to permit the manual opening and closing of the cavity blocks. A means of disengaging the driving of the cavity blocks 6 and 11 from the blade is depicted in FIGS. 11 and 12.

These figures are a sectioned view according to the plane I-I in FIG. 3. This view relates to the lug 32, which is movable in the slots 30 and 23 respectively for the purpose of displacing the cavity block 6.

The lug 32 is produced in two sections, these being an upper section 32a adapted to slide in the slot 30 and a lower section 32b adapted to slide in the section 23. The upper section 32a is caused to slide vertically in a central opening in the lower section 32b, but without being attached thereto.

The upper section 32a of the lug is secured by a screw 32c to the slider 6C. The latter is integral with the block 6.

An orifice 1a is arranged in the lower plate 1 beneath the mobile plate 9.

The block 11 can be disengaged in the same way.

The movement of the block 6 is described below.

When the cavity blocks 6 and 11 must be driven by the driving motor for the mobile plate 9, the upper section 32a of the lug is attached to the slider 6C, as can be seen in FIG. 12. The lug slides on its lower section 32b in the slot 23 when the mobile plate is set in motion. The upper section 32a, being integral with 32b, slides in the slot 30 and drives the slider 6C and the block 6 via the screw 32c.

When it is wished to disengage the mechanism and to be able to open or close the blocks 6 and 11 of the tooling manually, the lug is positioned in alignment with the orifice 1a, and all that is then necessary is to remove the screw 32c. The upper section 32a of the lug slides towards the bottom in the orifice 1a across the lower section 32b. It is then possible to displace the block 6 independently of the mobile plate. A button 110 makes it possible to take hold of the block 6 and to displace it.

It is possible to disengage the cavity block 7 for the root of the mobile plate 9. One solution involves disassociating the lug from the slider and withdrawing it through the top.

Another solution, which is not illustrated here, involves forming a lug at the extremity of a rod accommodated in the cavity block 7 in its longitudinal prolongation. When the lug is engaged in the block 7 and in the mobile plate 9, the movement of the block is integral with that of the plate 9. The lug is simply engaged in a suitable vertical orifice in the mobile plate 9 and may be extracted therefrom by a vertical displacement. When it is wished to render the block 7 independent of the mobile plate 9, the lug 33 is raised by the rod. The latter is then able to slide freely in the slot.

The invention claimed is:

1. A mold for producing a turbomachine blade model comprising:
   a cavity including at least a first cavity element and a second cavity element;
   a first cavity block supporting the first cavity element;
   a second cavity block supporting the second cavity element;
   a base plate that is fixed and forms a base for the first cavity block and the second cavity block;
   a plate that is mobile in translation relative to the base plate along a first direction; and
   a mechanism extending from the plate through the base plate to the first cavity block and the second cavity block in a second direction perpendicular to the first direction,
   wherein wax is injected into the cavity and the first cavity element forms an intrados face and the second cavity element forms an extrados face of a blade of the turbomachine blade model,
   wherein the first cavity block and second cavity block are mobile relatively in a horizontal movement plane between a closed position for injecting the wax and an open position for removing a part following injection of the wax, and
   wherein the mechanism drives the first cavity block and the second cavity block in the horizontal movement plane with a relative displacement between the plate and the base plate along the first direction.

2. The mold as claimed in claim 1, wherein the mechanism includes lugs,
   wherein each lug is integral with a respective one of the first cavity block and the second cavity block and is guided in a respective slot arranged in the base plate and a respective slot arranged in the plate,
   wherein the displacement of the plate drives each lug in the respective slots to drive the first cavity block and the second cavity block.

3. The mold as claimed in claim 1, wherein the first cavity block and the second cavity block are mobile in a circular arc in opposite directions.

4. The mold as claimed in claim 1, further comprising:
   a third cavity element; and
   a third cavity block that supports the third cavity element and is mobile in relation to the first cavity element and the second cavity element between a respective closed position for injecting the wax and a respective open position for removing the part following the injection of the wax,
   wherein the third element forms a root of the blade.

5. The mold as claimed in claim 4, wherein the third element is mobile in translation along the first direction.

6. The mold as claimed in claim 1, further comprising a part ejector for removing the part from the cavity on opening the first cavity element and the second cavity element,
   wherein the mechanism includes protrusions extending from the plate that drive plates connected to the part ejector to rotate the part ejector.

7. The mold as claimed in claim 6, wherein the part ejector is positioned between the first cavity block and the second cavity block in the closed position for injecting the wax.

8. The mold as claimed in claim 1, wherein the mechanism includes a lug connected to the plate and at least one of the first cavity block and the second cavity block,
   wherein the lug is disconnected so as to make a displacement of the at least one of the first cavity block and the second cavity block independent from the relative displacement between the plate and the base plate along the first direction.

* * * * *